March 21, 1950     S. C. CARTER     2,501,313
JOINT CONSTRUCTION
Filed Aug. 22, 1945                    2 Sheets-Sheet 1
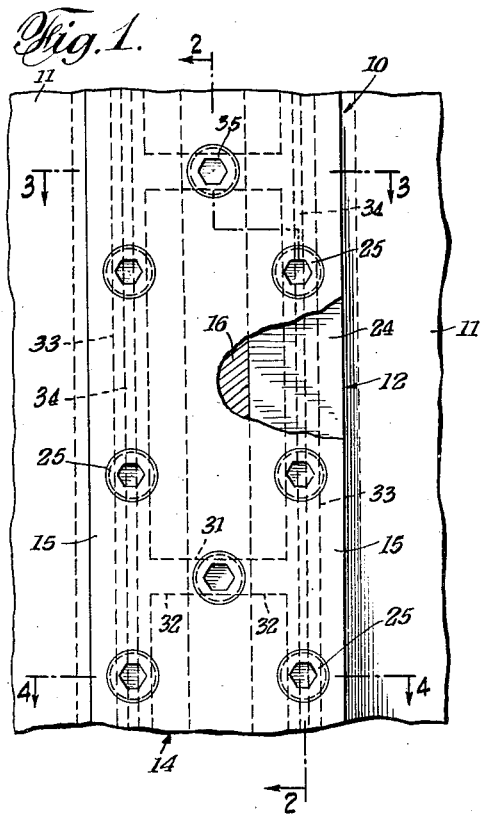
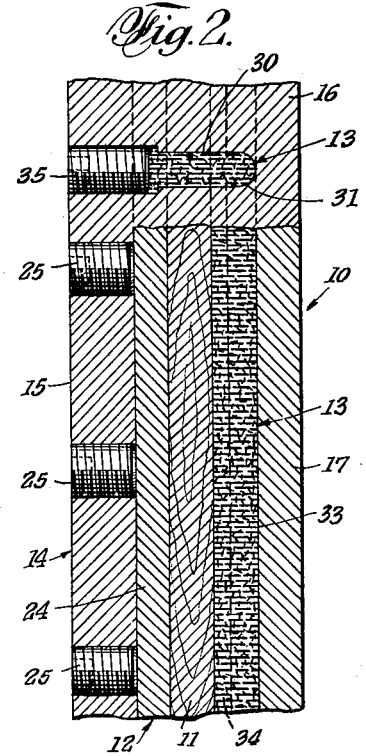
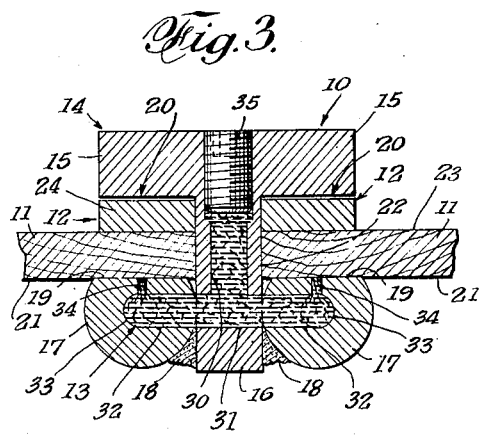
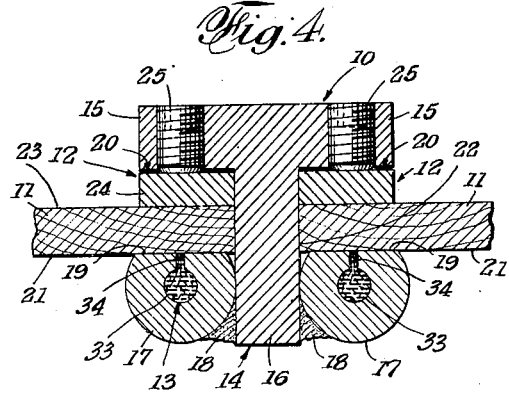
INVENTOR.
SAMUEL C. CARTER
BY
ATTORNEY March 21, 1950   S. C. CARTER   2,501,313
JOINT CONSTRUCTION
Filed Aug. 22, 1945   2 Sheets-Sheet 2
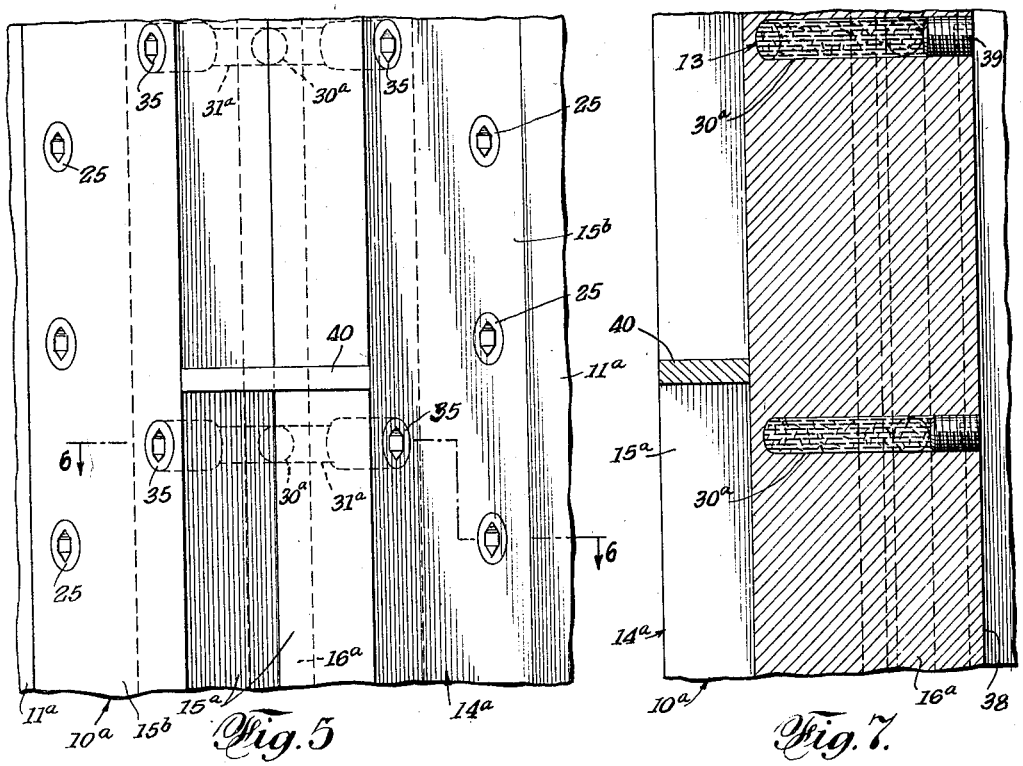
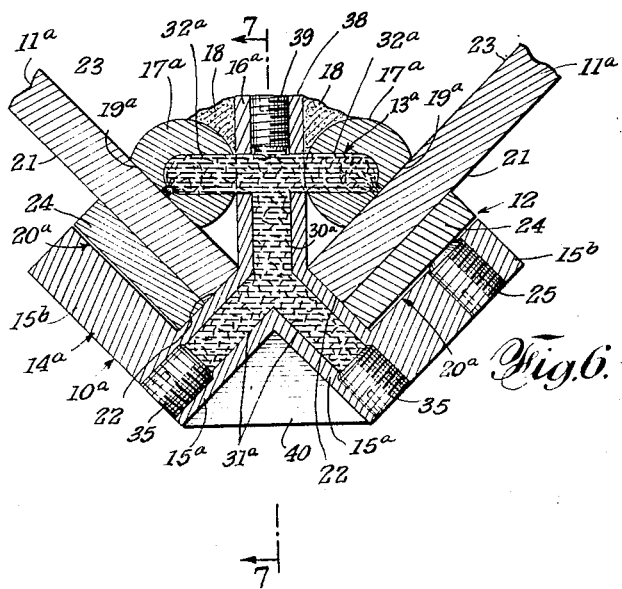
INVENTOR.
SAMUEL C. CARTER
BY
ATTORNEY Patented Mar. 21, 1950

2,501,313

UNITED STATES PATENT OFFICE 2,501,313

JOINT CONSTRUCTION

Samuel C. Carter, Glendale, Calif.

Application August 22, 1945, Serial No. 611,968

8 Claims. (Cl. 20—4)

This invention relates to joint constructions and relates more particularly to an improvement in sealed joints. The invention has for an object the provision of a simple, effective, safe and leak-proof joint for containers, tanks, and other like vessels or structures.

My invention has many uses and can be applied for sealing the joints of the component walls or partitions of many types of vessels, and will greatly facilitate the economic manufacture of fluid storing vessels having separately formed walls and partitions. My invention is particularly applicable to sealing the wall and partition joints of relatively large, inexpensively constructed vessels such as liquid storage tanks and the like. It is particularly applicable to vessels in which the walls and partitions are made of plywood or hard paper board, or the like. The component walls of tanks such as I have indicated are usually not metallic, and cannot be welded or riveted, and gluing or fastening by means of screws, or the like, is not feasible to insure safety and effective leak-proofing.

By my invention I have provided a joint construction for walls or partitions such as I have referred to, which is safe, sure, leak-proof, and entirely effective for the purpose intended.

Another object of my invention is to provide an improved joint construction for walls or partitions of the character indicated for effectively sealing the joint between adjacent parts or edges of said walls or partitions without drilling, boring, or otherwise cutting into said walls or partitions.

Another object of my invention is to provide a joint structure whereby overlap of the walls being joined is made unnecessary and whereby said walls are retained in position wholly or in part by lateral pressure applied by the joint structure.

Another object of my invention is to provide a joint structure incorporating flowable sealing means for the joint which is applicable after the structure is in joint connecting position.

A further object of my invention is to provide a joint structure of sufficient strength and rigidity to comprise strengthening and stiffening means for a tank, or like vessel, having thin or non-metallic walls.

The various objects and features of my invention will be fully understood from the following detailed description of typical preferred forms and applications of my invention, throughout which description reference is made to the accompanying drawings, in which:

Fig. 1 is a fragmentary outside face view of a joint structure embodying my invention as applied to co-planar walls;

Fig. 2 is a longitudinal sectional view thereof taken on the line 2—2 of Fig. 1;

Figs. 3 and 4 are cross sectional views taken on the lines 3—3 and 4—4 of Fig. 1, respectively;

Fig. 5 is a fragmentary outside view directed at the corner of a vessel and showing an embodiment of my invention as applied to walls at an angle to each other;

Fig. 6 is a cross sectional view taken on the line 6—6 of Fig. 5; and

Fig. 7 is a longitudinal sectional view taken on the line 7—7 of Fig. 6.

My joint structure may be said to include, generally, an elongated, preferably fabricated, joint unit or member 10 preferably positioned between adjacent edge portions of walls, partitions, or the like parts 11 and having portions overlying both surfaces of said edge portions, pressure or clamp means 12 for locking said wall parts in place, and packing means 13 carried by said member and having sealing engagement with said wall parts.

While the member 10 can be integrally formed, it would ordinarily be rather difficult and expensive to manufacture. I prefer, therefore, to fabricate said member and I show it as being made of three essential elements.

In the form of the invention which is illustrated in Figs. 1 to 4, inclusive, and which I will now describe, I fabricate member 10 of an elongated, preferably metal, T-shaped bar 14 having flanges 15 and a central web 16, and a pair of extra heavy iron or steel pipes 17 which are welded to either side of the web 16 as at 18, to make member 10 a substantially H-shaped cross section. I also preferably provide flat faces 19 on the sides of the pipes opposite or facing the flanges 15 whereby said unit 10 is formed with opposed outwardly directed, longitudinal, substantially rectangular grooves 20 each defined by one of the flat faces 19, a side of the web 16 and the inner surface of the adjacent flange 15.

The member 10 which I have provided is adapted to be positioned between adjacent longitudinal edge portions of the wall parts 11 with said portions in the grooves 20. As previously indicated, said walls may be considered as non-metallic, as they are preferably made of hard paper board, or the like. I place the unit so that the flat faces 19 engage against the inner surfaces 21 of said wall parts with the edges 22 of said wall parts abutted against opposite sides of the web 16. Thus, the flanges 15 of the T-bar 14 are positioned along and spaced from the outer surfaces 23 of the wall parts 11.

The pressure or clamp means 12 which I have provided for locking the member 10 and the wall parts 11 together includes longitudinal pressure plates or bars 24 preferably coextensive in length with the member 10 and of rectangular cross section to fit freely in the grooves 20 with or beside the wall parts 11. I also provide a plurality of pressure screws 25, preferably headless, aligned along each flange 15 and directed inwardly toward said pressure bars 24 to engage the bars to force them against the outer wall surfaces 23 and thereby create a reactive force which tightly presses the flat faces 19 against the inner wall surfaces 21.

It is evident that the joint structure that I have provided effectively and securely holds a wall part or unites the wall parts 11 and provides rigid stiffening means for strengthening a vessel incorporating said wall parts.

The packing or sealing means which I have provided includes passages which may be formed by bores and slits provided in the joint member 10 to carry packing so it effects a fluid seal between the inner surfaces 21 of the wall parts and the flat faces 19 of the member 10. The packing material which I contemplate using may vary greatly in composition. I prefer to use a composition which, generally, comprises a metallic or partially metallic material which is solid at normal temperatures and pressures and which is capable of limited distortion and flow when subjected to high pressures. Flattened particles or flakes of metal, or the equivalent, are an essential ingredient of the material I contemplate using and the material may generally comprise such ingredients as polymerized chloroprene flour, castor oil, and a neoprene cement binder. One form of such packing material is disclosed in my patent entitled "Packing material" No. 2,286,260, dated June 16, 1942.

I show the web 16 of the T-bar 14 of the joint unit 10 as having a plurality of spaced blind holes 30 entering the web from the edge having the flanges 15. A transverse hole 31 is provided in the web at the inner end of each hole 30 so its ends occur beneath the pipes 17. I provide each pipe 17 with transverse holes 32 aligned with respective holes 31 and communicating with the central longitudinal passages 33 in the pipes 17. In the above manner, I provide each unit 10 with a plurality of T-shaped packing material passages which connect with the pipe passages 33 and which are suitably spaced along the length of said unit.

From the side of each pipe 17 which has the flat face 19 I form a longitudinal slit or throat opening 34 of relatively narrow width, say about one-sixteenth of an inch, and extending for the full length of each pipe. Said slits 34 extend into the pipes to communicate with the passages 33.

I introduce the packing material into the holes 30 and apply sufficient pressure to it to cause it to flow through the passages above described, to enter the slits 34. Packing at the slits engages against the surfaces 21 of the wall parts that may be in the grooves to effectively seal between member 10 and the wall parts. It will be noted that the slits 34 are restricted as compared with the size of the pipe passages. As the packing material is forced into said slits from said pipe passages, the metal flakes will seek to assume a somewhat ordered and parallel side by side relation. The flakes also will squeeze the major portion of the other ingredients of the packing material out from around them, and the thin edges of the flakes, now quite close together, will contact with and be tightly pressed against the wall surfaces 21. A metal seal for the joints of the vessel is thus obtained.

I thread a preferably headless closure screw 35 in the outer portion of each hole 30 to retain the packing material in place and to afford access to the packing passages so that additional packing material may be inserted in the joint, if desired. It will be apparent that the threaded members 35 may be operated or employed to exert pressure on the packing.

The invention as embodied in Figs. 5, 6 and 7, is similar in all important respects to that above described, except that the joint member 10ᵃ joins the wall parts 11ᵃ which are at an angle to each other as at a corner. I show a right angle relation although said wall parts can be at any angle and the member 10ᵃ designed accordingly. In this form of the invention the web of member 10ᵃ is divided or split at the end carrying the flanges 15ᵇ and the divided portions 15ᵃ of the web are made divergent so member 10ᵃ is Y-shaped in cross section. The pipes 17ᵃ have their flat inner sides 19ᵃ facing and parallel with the inner sides of flanges 15ᵇ and the holes 32ᵃ extended at right angles to the sides 19ᵃ. The other details, parts, and elements of this joint structure are shown the same as the structure first described and, therefore, they are designated with the numerals the same as those applied to parts and elements of the form first described. The web is provided with holes 30ᵃ and branch holes 31ᵃ in the divergent portions 15ᵃ. The holes 30ᵃ are drilled from the inner edge surface 38 of the web 16ᵃ and I provide a closure plug 39 for each hole. In the longitudinal groove formed by the diverging portions 15ᵃ I provide a plurality of spaced webs 40 to strengthen the structure. The packing material is applied as before described through the double sets of holes 31ᵃ to effect the wall seal previously described.

As can be seen, the corner joint structure which I have provided, in addition to effectively joining and sealing the walls of a vessel, comprises an extremely strong and rigid structural reinforcement for said corner and serves to materially strengthen said vessel.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A joint for holding a wall part including, an elongate member having a channel therein with fixed opposed sides, the wall member being received between the sides so it has one face bearing on one of said sides, clamp means acting between the opposite side of the channel and the opposite face of the wall part operable to clamp the wall part against the first mentioned side, and sealing means introducing flowable packing from said member to the wall part in the channel to seal therewith, the said member including a web forming the bottom of the channel, a flange projecting from the web and forming one side of the channel, and a tubular part attached to the web and forming the other side of the channel, the said means including a passage in the said member communicating with the interior of said tubular part and a duct from the interior of said tubular part to the side thereof which faces the wall part.

2. A joint for holding a wall part including, an elongate member having a channel therein with fixed opposed sides and receiving the wall member being received between the sides so it has one face bearing on one of said sides, clamp means acting between the opposite side of the channel and the other face of the wall part and operable to clamp the wall part against the first mentioned side, and sealing means introducing flowable packing from said member to the wall part in the channel to seal therewith, the said member including a web forming the bottom of the channel, a flange projecting from the web and forming one side of the channel, and a tubular part attached to the web and forming the other side of the channel, the said means including a packing passage extending through the web from the exterior thereof to the said tubular part supplying packing to the interior of said tubular part, and a packing duct extending longitudinally of the tubular part from the interior thereof to the side thereof facing the wall part.

3. A joint for holding a wall part including, an elongate member having a channel therein with fixed opposed sides, the wall member being received between the sides so it bears on one of said sides, clamp means acting between the opposite side of the channel and the other face of the wall part and operable to clamp the wall part against the first mentioned side, and sealing means introducing flowable packing from said member to the wall part in the channel to seal therewith, the said member including a web forming the bottom of the channel, a flange projecting from the web and forming one side of the channel, and a tubular part attached to the web and forming the other side of the channel, the said means including a packing passage extending through the web from one edge to the other and having communication with the interior of the tubular part, closures for the passage at the edges of the web, and a packing duct extending longitudinally of the tubular part from the interior thereof to the side thereof facing the wall part.

4. A joint for holding two wall parts including, an elongate channel member having a web with projecting flanges at opposite sides thereof and elongated parts attached to opposite sides of the web, the elongate parts being spaced from the flanges forming channels the bottoms of which are formed by the web, each channel being such as to receive a wall part, one face bearing on one side of the channel, clamp means at each channel acting between the opposite side of the channel and the wall part for clamping a wall part to the first mentioned side of the channel, and means introducing flowable packing through the web and to the parts of the channel member to which the wall parts are clamped to seal between the channel member and said wall parts.

5. A joint for holding two wall parts including, an elongate channel member having a web with projecting flanges at opposite sides thereof and elongate parts attached to opposite sides of the web, the elongate parts being spaced from the flanges forming channels the bottoms of which are formed by the web, each channel being such as to receive a wall part so it bears on one side of the channel, clamp means acting between the opposite side of each channel and the wall part therein for clamping the wall part to the first mentioned side of the channel, and means introducing flowable packing through the web and to the parts of the channel member to which the wall parts are clamped to seal between the channel member and said wall parts, the portion of the web from which the flanges project being divided into divergent web portions each carrying a flange.

6. A joint for holding two wall parts including, an elongate channel member having a web with projecting flanges at opposite sides thereof and elongate tubular parts attached to opposite sides of the web, the elongate parts being spaced from the flanges forming channels the bottoms of which are formed by the web, each channel receiving a wall part so it bears on one side of the channel, clamp means at each channel acting between the opposite side of the channel and the wall part therein for clamping the wall part to the first mentioned side, and means introducing flowable packing through the web and to the parts of the channel member to which the wall parts are clamped to seal between the channel member and said wall parts including a packing passage in the web in communication with the interiors of said tubular parts and ducts from the interiors of the tubular parts to the sides thereof which face the flanges.

7. In combination, a wall part, an elongate member having spaced side parts defining a channel receiving the edge portion of the wall part, one side part being tubular and having a face receiving the wall part, clamp means acting between the other side part and the wall part clamping the wall part to said face, and packing means including a packing passage in the said member communicating with the tubular side part and a duct in the tubular side part conducting packing from the interior of the tubular part to the wall part where it engages the tubular part.

8. In combination, two wall parts, an elongate web with flanges projecting from opposite sides thereof, tubular members attached to the sides of the web to face the flanges and to cooperate therewith to form channels receiving the edges of the wall parts, each wall part being in engagement with the inner side of one of the tubular members, clamps acting between the flanges and the wall parts holding the wall parts against the tubular members, and sealing means including packing passages in the web communicating with the interior of the tubular members, and ducts in the tubular members from the interiors thereof to their inner sides.

SAMUEL C. CARTER.

REFERENCES CITED

The following references are of record in the file of this patent:

UNITED STATES PATENTS

| Number | Name | Date |
|---|---|---|
| 234,186 | Hendrick | Nov. 9, 1880 |
| 837,767 | Aims | Dec. 4, 1906 |
| 1,761,451 | Ohnstrand | June 3, 1930 |
| 1,805,812 | De Witt | May 19, 1931 |
| 2,095,037 | Reintjes | Oct. 5, 1937 |
| 2,172,766 | Kuhner | Sept. 12, 1939 |
| 2,187,148 | Fisher | Jan. 16, 1940 |
| 2,246,600 | Putnam et al. | June 24, 1941 |
| 2,266,702 | Byers | Dec. 16, 1941 |
| 2,286,260 | Carter | Sept. 16, 1942 |

FOREIGN PATENTS

| Number | Country | Date |
|---|---|---|
| 325,345 | Germany | Sept. 14, 1920 |